(12) United States Patent
Zakharyan et al.

(10) Patent No.: US 9,472,794 B1
(45) Date of Patent: Oct. 18, 2016

(54) BATTERY MODULE HOUSING ASSEMBLY

(71) Applicant: Elitise LLC, Tucson, AZ (US)

(72) Inventors: Kagum G. Zakharyan, Tucson, AZ (US); Sergei N. Begliarov, Tucson, AZ (US); Jose Ortiz, Tucson, AZ (US)

(73) Assignee: Elitise LLC, Tucson, AZ (US)

( * ) Notice: Subject to any disclaimer, the term of this patent is extended or adjusted under 35 U.S.C. 154(b) by 0 days.

(21) Appl. No.: 14/985,774

(22) Filed: Dec. 31, 2015

Related U.S. Application Data

(63) Continuation of application No. PCT/US2015/046586, filed on Aug. 24, 2015.

(51) Int. Cl.
*H01M 2/10* (2006.01)
*H01M 2/30* (2006.01)
*H01M 2/20* (2006.01)

(52) U.S. Cl.
CPC ........... *H01M 2/1077* (2013.01); *H01M 2/105* (2013.01); *H01M 2/204* (2013.01); *H01M 2/206* (2013.01); *H01M 2/30* (2013.01)

(58) Field of Classification Search
None
See application file for complete search history.

(56) References Cited

U.S. PATENT DOCUMENTS

| | | | |
|---|---|---|---|
| 2,027,262 A | 1/1936 | Allen | |
| 6,023,146 A | 2/2000 | Casale et al. | |
| 6,174,618 B1 | 1/2001 | Nishiyama et al. | |
| 8,329,332 B2 | 12/2012 | Turbe et al. | |
| 8,420,242 B2 | 4/2013 | Sato | |
| 8,703,328 B2 | 4/2014 | Villarreal | |
| 8,974,951 B2 | 3/2015 | Park et al. | |
| 2007/0238018 A1* | 10/2007 | Lee | H01M 2/1077 429/159 |
| 2008/0113262 A1* | 5/2008 | Phillips | H01M 2/105 429/149 |
| 2010/0221591 A1* | 9/2010 | Ro kamp | H01M 2/1022 429/99 |
| 2010/0310922 A1 | 12/2010 | Villarreal et al. | |
| 2012/0045665 A1 | 2/2012 | Park | |
| 2012/0094153 A1 | 4/2012 | Fuller | |
| 2012/0094163 A1 | 4/2012 | Fuller | |
| 2012/0094541 A1 | 4/2012 | Fuller | |
| 2012/0247107 A1 | 10/2012 | Balk et al. | |
| 2013/0052487 A1 | 2/2013 | Park | |
| 2015/0072174 A1 | 3/2015 | DeKeuster et al. | |

* cited by examiner

Primary Examiner — Maria J Laios
(74) Attorney, Agent, or Firm — Venjuris P.C.

(57) ABSTRACT

A battery module housing assembly including an interior housing wall having a tapered housing interior edge acutely angled relative to the vertical, a frame having a tapered frame edge also acutely angled relative to the vertical and aligned and positioned for longitudinal contact with the tapered housing interior edge. During assembly, the tapered frame edge longitudinally contacts and slides against the tapered housing interior edge and guides the frame and battery cell therein to a fixed position against the interior housing wall.

20 Claims, 5 Drawing Sheets

BATTERY MODULE HOUSING ASSEMBLY

FIELD OF THE INVENTION

The present invention relates to battery module housing constructions that minimize the movement of battery cells within the battery module housing and facilitates electrical coupling of battery cell terminals to a battery module positive terminal and a negative terminal.

SUMMARY OF THE INVENTION

The present disclosure includes improvements to battery module housings, assemblies, or constructions and relates to improvements in the structures and mechanisms to secure one or more battery cells within a battery housing. In general, embodiments according to the description herein include a cell carrier comprised of one or more frames having one or several frame biasing edges or surfaces that contact and slide against one or several battery module housing interior wall biasing edges or surfaces. The battery module housing assembly is preferably constructed of injection molded plastic or equivalents. During assembly the frame biasing edges or surfaces and battery module housing interior wall biasing edges or surfaces guide the cell carrier to a fixed static position against the battery module housing interior wall. Additional aspects are summarized below.

A battery module assembly according to the description herein comprises an interior housing wall having a vertical dimension and a first tapered housing interior edge acutely angled relative to the vertical dimension, a first frame having at least one battery electrode aperture and a tapered frame edge acutely angled relative to the vertical dimension and aligned and positioned for longitudinal contact with the first tapered housing interior edge. The module assembly further includes at least one battery cell having a terminal and an external battery cell wall, the external battery cell wall in circumferential contact with the first frame at the battery electrode aperture and the battery cell accessible though the battery electrode aperture. During assembly, the first tapered frame edge longitudinally contacts and slides against the first tapered housing interior edge and guides the first frame and battery cell therein to a fixed position against the interior housing wall.

The battery module interior housing wall may further have at least a second tapered housing interior edge and the battery module assembly further include a second frame having at least one battery electrode aperture and a tapered second frame edge acutely angled relative to the vertical dimension and aligned and positioned for longitudinal contact with the second tapered housing interior edge, and at least one battery cell contacting the first frame and the second frame at the respective battery electrode apertures. During assembly, the first frame tapered frame edge and second frame tapered frame edge longitudinally contact and slide against the first tapered housing interior edge and second tapered housing interior edge, respectively and adjust the first frame and second frame and the battery cell therein to a fixed position. The first frame and the second frame may be coupled together by at least two frame ribs, which may each comprise a relatively narrow width beam coupled substantially perpendicularly on one end to the first frame and on a second end to the second frame.

The first frame may have two tapered frame edges and the second frame may have two tapered frame edges and the housing interior walls may have two tapered edges positioned to contact and slide against the two tapered first frame edges and the two tapered second frame edges. The function of the frame edges and tapered housing interior edges is to bias the first frame relative to the second frame before and during insertion of the first frame and second frame against the interior housing wall due to sliding contact between the two tapered first frame edges and the two tapered second frame edges against the tapered housing interior edges. The first frame is fixed relative to the second frame and the interior housing wall after completion of insertion of the first frame and second frame against the interior housing wall. The first frame and the second frame may each have a substantially flat internal frame portion with the electrode cell apertures and the substantially flat internal frame portions may each transition to the tapered frame edges on opposite sides of the internal frame portion.

The first frame and the second frame may each further comprise a frame surface that is substantially flat relative to the housing interior wall and positioned and oriented to contact and slide against the housing interior flat longitudinal sliding-surface during assembly. The first frame and the second frame may each further comprise a second tapered frame surface that is substantially parallel to and oriented to contact and slide against a second tapered housing interior surface during assembly. The first frame and the second frame may each further comprise at least two tapered frame surfaces that are substantially flat relative to the interior housing wall and positioned and oriented to contact and slide against flat housing interior longitudinal sliding-surfaces during assembly, and the first frame and the second frame may each further comprise at least two additional tapered frame edges that are substantially parallel to and oriented to contact and slide against additional tapered housing interior edges during assembly. Also, a bus bar may be coupled to the battery terminal and have a frame tab aperture that is oriented and positioned to receive a frame tab extending from at least one of the substantially flat internal frame portions. The frame tab may be substantially rectangular and the frame tab aperture may be a matching slot.

A battery module assembly may alternately include at least a first battery cell having respective battery cell ends with respective terminals, a battery cell carrier including a first frame and a second frame, wherein the first frame and the second frame each include a substantially flat portion having a battery terminal aperture, each battery terminal aperture in circumferential contact with one of the respective battery cell ends, the substantially flat portion transitioning to at least one frame biasing edge or surface and a battery cell housing having respective housing interior wall biasing edges or surfaces respectively positioned and oriented to bias each of the frame biasing edges or surfaces. The at least one frame biasing edge or surface may include a frame edge that is acutely-angled relative to the direction of insertion of the battery cell carrier into the housing and the housing interior wall biasing edge or surfaces comprise matching housing interior edges or surfaces that are equally acutely-angled.

The housing interior wall may include structural ribbing and the tapered housing interior edges and surfaces are formed by the edges and surfaces of the structural ribbing. The structural ribbing may comprise the edges of a shape selected from the group consisting of a rhombus, trapezoid, a kite and equivalent shapes having an edge or surface angled relative to the direction of insertion of the battery cell carrier into the housing. A second battery cell may be included also having respective battery cell ends with respective terminals and the first frame and second frame substantially flat portions each further include a second battery terminal aperture, each second battery terminal aperture in circumferential contact with one of the respective battery cell ends of the second battery cell, and at least one substantially flat electrically conductive bus bar oriented substantially parallel to the substantially flat portion may couple one of the first battery terminals to one of the second battery terminals. Further, the substantially flat portions may further include at least one frame tab that extends substantially perpendicularly from one of the substantially flat portions and insert into a respective frame tab aperture the bus bar in one correct orientation only. The frame tab may comprise a raised substantially rectangular protrusion and the frame tab aperture may comprise a substantially rectangular slot.

DESCRIPTION OF PREFERRED EMBODIMENTS

Figure 1:
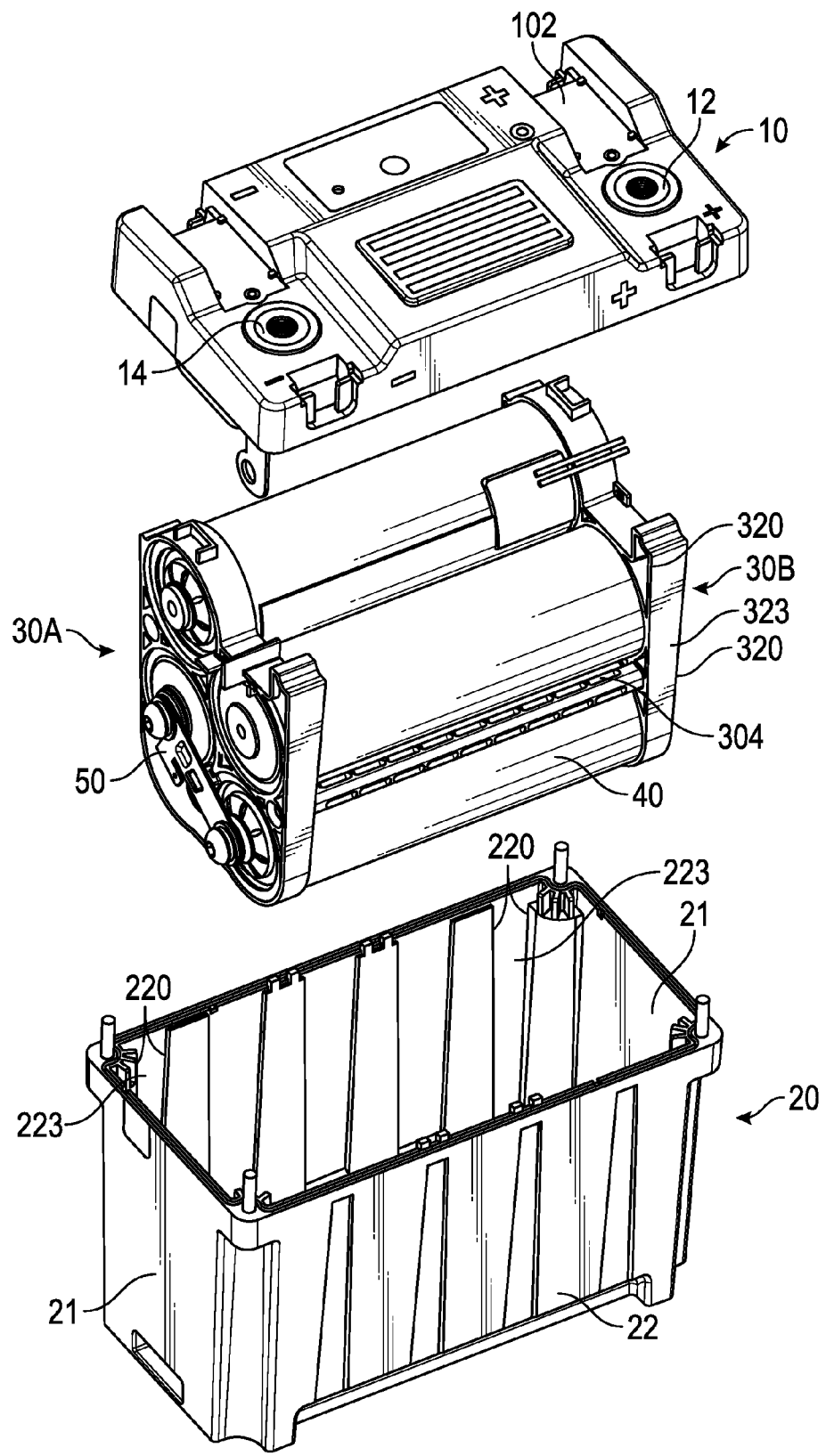
FIG. 1 illustrates a preferred embodiment of the battery module partly unassembled to show the battery module top portion 10, the battery module bottom portion 20, and battery cell carrier comprised of a first frame 30A and a second frame 30B with a plurality of battery cells 40. During assembly, the battery cell carrier, including the first frame 30A and the second frame 30B with a plurality of battery cells 40 therein, is loaded or inserted into the battery module housing bottom portion 20 and the battery housing top portion 10 is coupled to the battery housing bottom portion 20 to seal the battery module.
Figure 2:
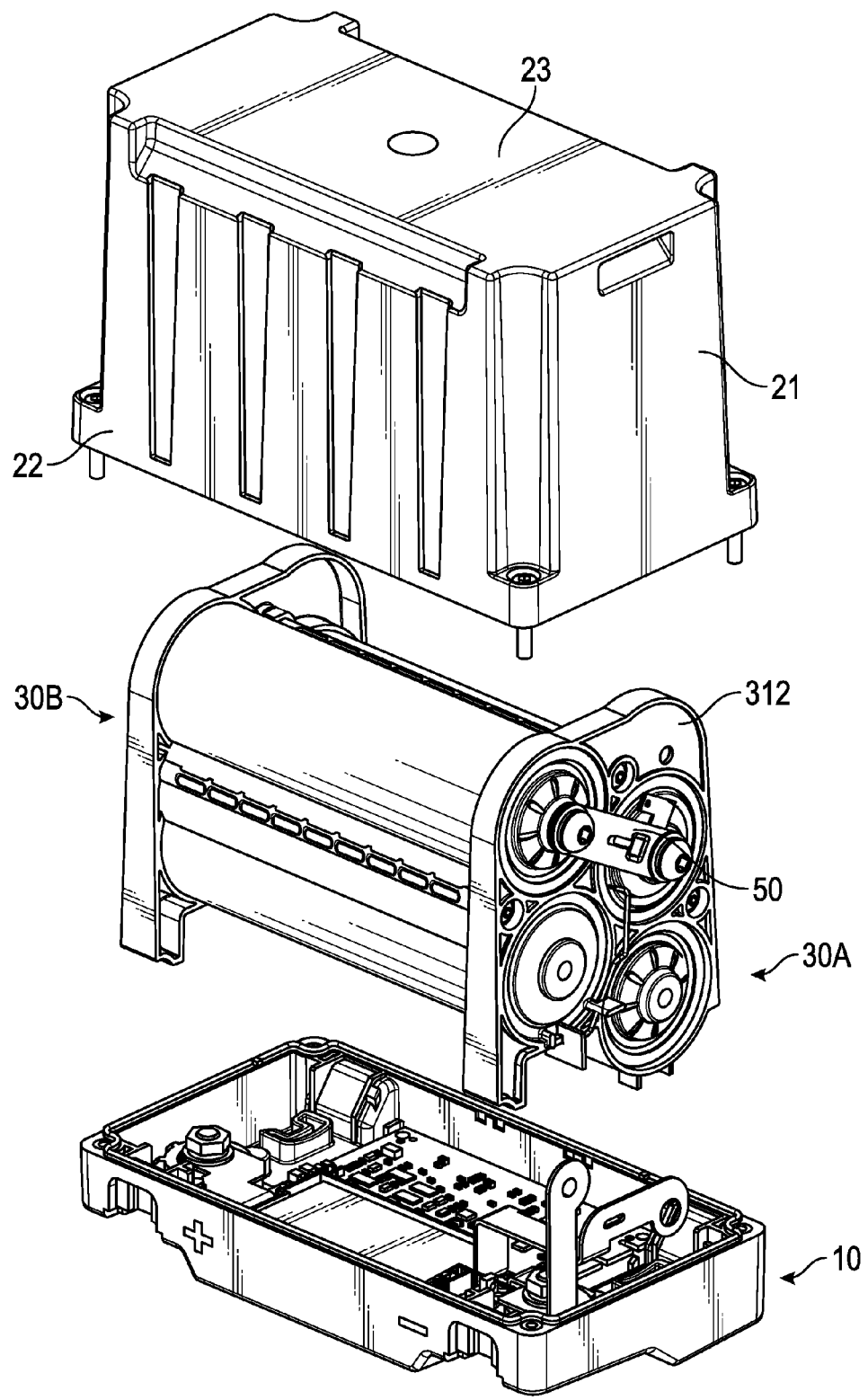
FIG. 2 illustrates a perspective view of the battery module flipped to reveal the internal details of the top portion 10. The battery cell carrier comprised of the first frame 30A and the second frame 30B include tapered frame edges 320 and tapered longitudinal frame sliding surfaces 323 that are aligned with and during assembly, make sliding contact with the interior housing wall tapered edges 220, and tapered interior wall sliding surfaces 223, respectively, until reaching a final and fixed position within the battery module bottom portion 20.

A battery module assembly incorporating aspects described herein is illustrated in FIGS. 1-5. The battery module assembly includes a battery housing that comprises a battery cell cavity, which in the illustrated embodiment, is a substantially rectangular-shaped volume sized to accommodate the battery cells 40 that create a desired battery voltage or amperage hours potential. A substantial number of battery modules will include a plurality of battery cells 40 electrically coupled together using electrical conductors such as wiring or bus bars that connect the terminals of one battery cell 40 to the terminals of a second battery cell 40 to meet the battery power requirements of the battery module. It is worth noting that while the illustrations are of an embodiment that includes four 3.2 volt battery cells coupled together electrically in series/parallel to create a battery module having at least a 12 volt potential, an alternate number of battery cells 40 are included in alternate battery module designs depending on the battery cell 40 potentials and the battery module power requirements. During assembly, at least one battery cell 40 is loaded into a battery cell carrier comprised of a first frame 30A and a second frame 30B and then loaded into the battery housing cavity in the direction of the bottom wall 23

The illustrated battery module housing wall has two housing end walls 21, two housing side walls 22, and a housing bottom wall portion 23, and is designed to house elongated battery cells 40 with a battery terminal on one end of the battery cell 40 and another battery terminal on the other end of the battery cell 40. After assembly, the housing end wall portions 21 are adjacent the terminals of the battery cells 40, and the housing side wall portions 22 and bottom wall portion 23 extend adjacently substantially parallel to the battery cell 40 walls. Moreover, whereas the battery cells 40 illustrated are tubular or cylindrical in shape, the teachings of the description can be extended to alternate battery cell 40 shapes or with anodes and cathodes on one end of the battery cell 40.

The exterior housing corners include fastening structures aligned with complementary structures on the battery housing top portion 10. Screws, bolts, clips, or other fasteners can be used to connect or couple the battery housing top portion 10 to the first distal ends of the battery housing wall portions. Preferred fastening structures include screw apertures or bolt apertures in flat surfaces located in each corner of the external battery housing 20, which flat surfaces are oriented perpendicularly to the direction of insertion of the first frame 30A and second frame 30B into the battery housing. Elongated corner reliefs, troughs, or indentations in the housing wall extend from the flat surfaces to the second distal ends of the side wall and end wall to allow unencumbered access of a tool such as a screw-driver or nut-driver to a fastener inserted into the screw or bolt apertures.

The battery housing top portion 10 couples to the top edge of the housing interior wall and has battery housing terminals, 12 and 14, that are coupled by electrical conductors to the least one battery cell 40 to create a battery module potential. Battery terminal aligned slots or trenches 102 are oriented substantially perpendicularly to the housing side wall portions 22 and aligned with the positive battery module terminal 12 and the negative battery module terminal 14. The battery terminal aligned slots are sized to receive electrically conductive battery module coupling brackets and bus bars to couple the battery terminals of adjacent battery modules together and build aggregate batteries comprised of multiple battery modules that together provide greater power potential than a single battery module. The preferred battery module coupling brackets and bus bars are coated with non-conductive plastic or equivalent material that electrically insulates the battery terminals, 12 and 14, from electrical shorting.

The housing wall includes at least one, or a first, interior housing wall tapered edge 220 comprising an edge that is acutely-angled relative to the vertical dimension of the battery housing side wall 22, or alternatively acutely-angled relative to a normal extending in the direction of insertion of the battery cells 40 into the housing cavity and towards the housing bottom wall 23. A preferred angle is about 1.4 degrees and a preferred range is between about 1 degree and 2 degrees, but other angles are also possible, provided that during assembly the angle chosen biases the battery cell carrier against the housing interior wall 22 to a fixed position in the battery module cavity. During assembly, or loading of the battery cell carrier into the battery module bottom portion 20, the interior housing wall tapered edge 220 functions as a biasing surface against which a correspondingly shaped biasing surface or tapered edge on a first frame 30A or a second frame 30B of the battery cell carrier makes contact and slides causing or allowing positional adjustment of the battery cell carrier within the battery housing until a final, fixed or static position is reached. Moreover, while the illustrated embodiment discloses linearly tapered interior housing walls and frame biasing surfaces, "taper" or "tapering" as used herein means that the cross-sectional area of the battery module bottom portion 20 is less at the bottom of the battery module bottom portion 20 that at the top edge, adjacent the battery module top portion 10. The "taper" or "tapering" also encompasses non-linear tapers including, but not limited to, curving tapers.

The interior housing wall tapered edge 220 is substantially equivalently shaped to match an edge on the first frame 30A and restrictively guides the first frame 30A to an eventual restricted or static position within the battery housing bottom portion 20. In preferred embodiments, at least a second interior housing wall tapered edge 220 is substantially equivalently shaped the same as an edge on the second frame 30B and during assembly also restrictively guides the battery cell carrier to an eventual restricted or static position within the battery housing bottom portion 20. A preferred interior housing wall tapered edge 220 comprises a raised ridge, boss, or surface that is acutely-angled relative to a normal extending from the battery housing bottom wall 23 and aligned to contact and slide against an equivalently shaped and aligned tapered edge on the first frame 30A or second frame 30B of the battery cell carrier. Moreover, whereas the interior housing wall tapered edges 220 can be located on the housing interior end wall portions 21, or even the housing interior wall corners, the preferred placement of the at least one tapered housing interior edge is on the battery housing interior side wall(s) 22.

Figure 3:
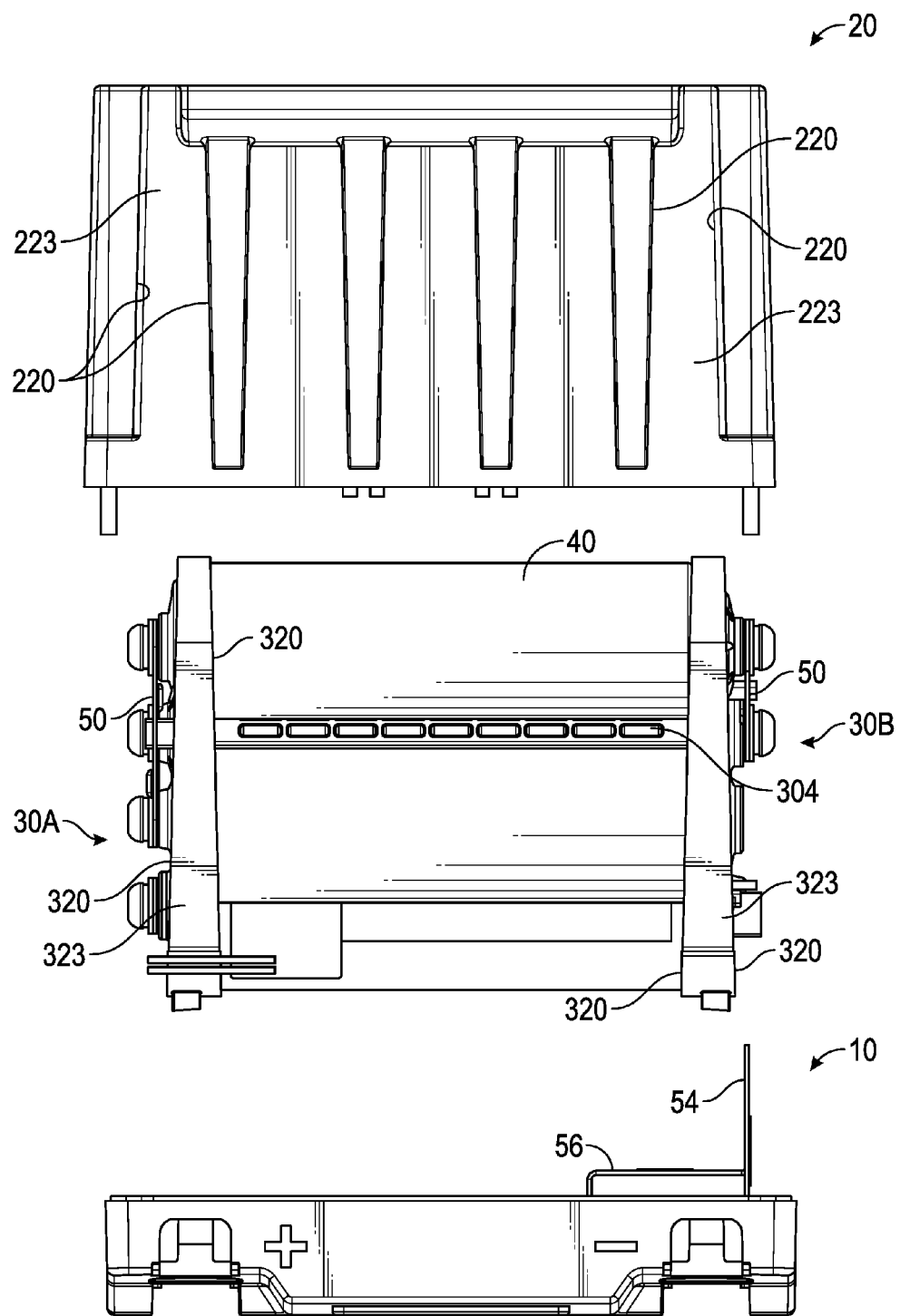
FIG. 3 illustrates a front view of the unassembled battery module flipped over to show the acutely-angled tapered frame edges 320 and acutely-angled tapered longitudinal frame sliding surfaces 323 that each contact and slide against the interior housing wall tapered edges 220, and tapered interior wall sliding surfaces 223, respectively, during loading of the battery cell carrier into the battery housing bottom portion 20.
Figure 4:
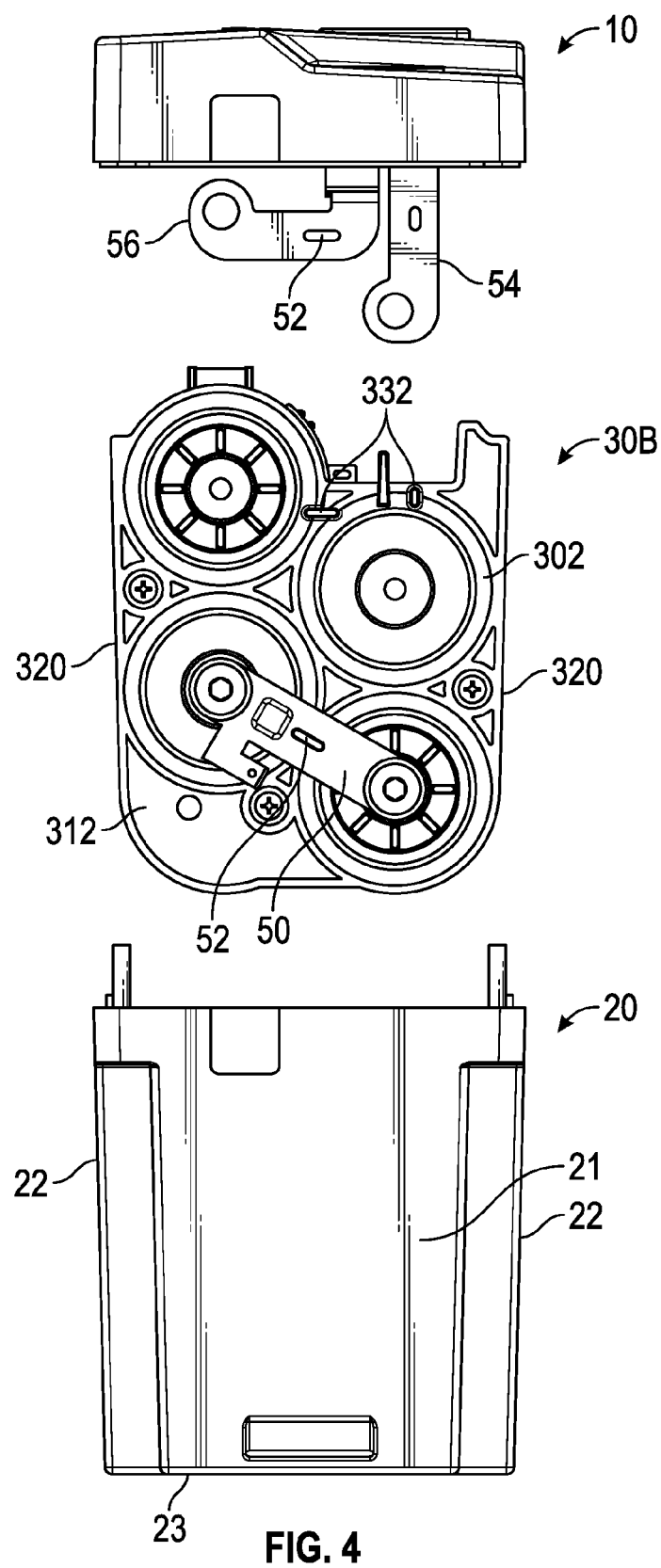
FIG. 4 illustrates a side or end view of the battery module showing the substantially flat interior frame portion 312 that transition to the acutely-angled tapered frame edges 320.

FIG. 3 illustrates the preferred interior housing wall tapered edges 220, which includes at least four tapered housing interior edges 220 on each housing interior side wall 22 with each tapered housing interior edge 220 opposite another tapered housing interior edge 220 on the opposite housing interior side wall 22. Furthermore, it is preferred that each tapered housing interior edge 220 comprises a longitudinal segment of structural ribbing included on the interior side wall 22 wherein the structural ribbing comprises the edge of an angled parallelogram such as rhombus, trapezoid, kite or other equivalent shape(s) having an edge angled relative to the direction of insertion of the first frame 30A and second frame 30B into the battery module bottom portion 20. The preferred structural ribbing comprises a trapezoidal-shaped structural rib that extends for at least 70% the height of the housing interior side wall 22 but preferably for about 85% of the height of the battery housing interior side wall 22 and aligns with a matching or correspondingly shaped and sized tapered positive edge on the first frame 30A and/or second frame 30B. Further, each trapezoidal-shaped structural rib or ridge that comprises an interior housing wall tapered edge 220 is a negative edge that is acutely-angled relative to a normal extending from the bottom wall 23 and aligned to contact, receive, and slide against a matched or equivalently angled tapered frame edge 320 that is a positive edge, on the battery cell carrier first frame 30A or second frame 30B.

A tapered interior wall sliding surface 223 is adjacent each of the interior housing wall tapered edges 220, and contacts and slides against an aligned sliding-surface on the first frame 30A and/or the second frame 30B. Finally, the housing interior end walls 21 are positioned an adequate distance from the first frame 30A and the second frame 30B to provide a gap to allow the battery cell terminals to be coupled together by bus bars 52 but not contact the housing interior end walls 21 when the first frame 30A and second frame 30B and battery cells 40 therein are inserted into the battery module bottom portion 20.

The preferred battery cell provides lateral and transverse support for the at least one battery cell 40 both before and during insertion of the battery cell carrier into the battery housing bottom portion 20. The preferred battery cell carrier comprises at least a first frame 30A that secures one or more battery cells 40 within the battery housing bottom portion 20 and includes a battery cell electrode aperture 302 though which at least one battery cell electrode is accessible. In a first alternate but non-preferred embodiment, the first frame 30A secures one end of the battery cell 40 while a housing interior wall portion, such as the housing interior end wall 21 secures the second end of the battery cell 40. The first frame 30A includes a tapered frame edge 320 that contacts and slides against an interior housing wall tapered edge 220 on the side wall portion 22 and biases the first frame 30A and the at least one battery cell 40 therein to a static, secured position, within the battery housing 20. Moreover, the housing interior side wall portion 22 preferentially includes interior housing wall tapered edges 220 on opposite side wall portions 22 that are each aligned with a tapered frame edge 320 on the battery cell carrier first frame 30A or second frame 30B and against which each make contact and slide during insertion of the battery cell carrier 30 into the battery housing 20 until a fixed, static and secured position is reached.

A preferred battery cell carrier is comprised of a first frame 30A and a second frame 30B, which may be coupled to each other by at least two battery cell frame ribs 304 and the at least one battery cell 40. Each frame rib 304 comprises a relatively narrow width beam, or support that transversely contacts and supports the battery cell 40 wall in the frame rib 304 mid-section and contacts the first frame 30A at one end of the frame rib 304 and contacts the second frame 30B at the second end of the frame rib 304. Battery electrode or terminal apertures 302 in the first frame 30A and the second frame 30B circumferentially contact the end portions of the battery cells 40 adjacent the battery cell terminals and O-rings are positioned between the battery electrode apertures 302 and the end portions of the battery cell walls to allow a modest amount of cushioned transverse positional adjustment during insertion of the first frame 30A and second frame 30B into the battery housing bottom portion 20. The at least two battery cell frame ribs 304 make transverse contact along and against the middle portion(s) of the battery cell side walls and facilitate assembly of the battery module by securing the at least one battery cell 40 in the cell carrier between the first frame 30A and the second frame 30B before and during insertion or removal of the battery cell carrier into or from the battery housing 20.

The first frame 30A and the second frame 30B each comprise a substantially flat internal frame portion 312 with one or more battery cell electrode apertures 302 therein, which are oriented substantially perpendicularly to the at least one battery cell 40. Moreover, the substantially flat internal frame portion 312 of the first frame 30A and the second frame 30B each transition to at least one tapered frame edge 320 on opposite sides of the internal frame portion 312. In preferred embodiments the first frame 30A and the second frame 30B each have at least a first tapered frame edge 320 and a second tapered frame edge 320 that are each oriented to contact an interior housing wall tapered edge 220 positioned and aligned for sliding contact with the respective first or second tapered frame edge 320 and optimally further includes a tapered longitudinal frame sliding surface 323 positioned between the first tapered frame edge 320 and the second tapered frame edge 320 and that is also acutely-angled relative to a normal extending from the housing bottom wall 23 and parallel to and oriented to contact and slide against a tapered housing interior wall sliding surface 223 during loading of cell carrier into the housing bottom portion 20. Additional instances of the tapered longitudinal frame sliding surfaces 323, and first and second tapered frame edges 320, are repeated on the first frame 30A and the second frame 30B and positioned and oriented to also contact and slide against positioned and aligned tapered interior wall sliding surfaces 223 and interior housing wall tapered edges 220, respectively.

One or more battery cell terminals in the cell carrier 30 may be electrically coupled together by a battery cell terminal bus bar 50 that couples together a terminal of a first battery cell 40 to a terminal of a second battery cell 40 to create an accumulated battery cell potential. Preferred battery cell terminal bus bars 50 are constructed of a relatively flat piece of electrically conductive metal with a flat surface of the battery cell terminal bus bar 50 oriented substantially parallel to the surface of the substantially flat internal frame portion 312. Further, electrical coupling of the battery cells 40 is accomplished in a specified manner by oriented and positioned frame tabs 332 that extend substantially perpendicularly from the substantially flat interior frame portion 312 and insert into frame tab apertures 52 in each battery terminal bus bar 50 in one correct orientation only. In particular, each battery cell terminal bus bar 50 has a single orientation and placement that correctly couples at least two battery cell 40 terminals together to ensure that the battery cells 40 are properly and safely coupled electrically, and assembled into the battery housing bottom portion 20, correctly. During assembly of the battery module, the battery cell terminal bus bar 50 is oriented and positioned so that the size-matched, positioned, and oriented frame tab 332 inserts into a size-matched, positioned, and oriented frame tab aperture(s) 52 in the battery cell terminal bus bar 50, which is fastened at its ends, such as by screws, to a threaded opening or aperture in a terminal in the first battery cell 40 and a terminal in a second battery cell 40.

Figure 5:
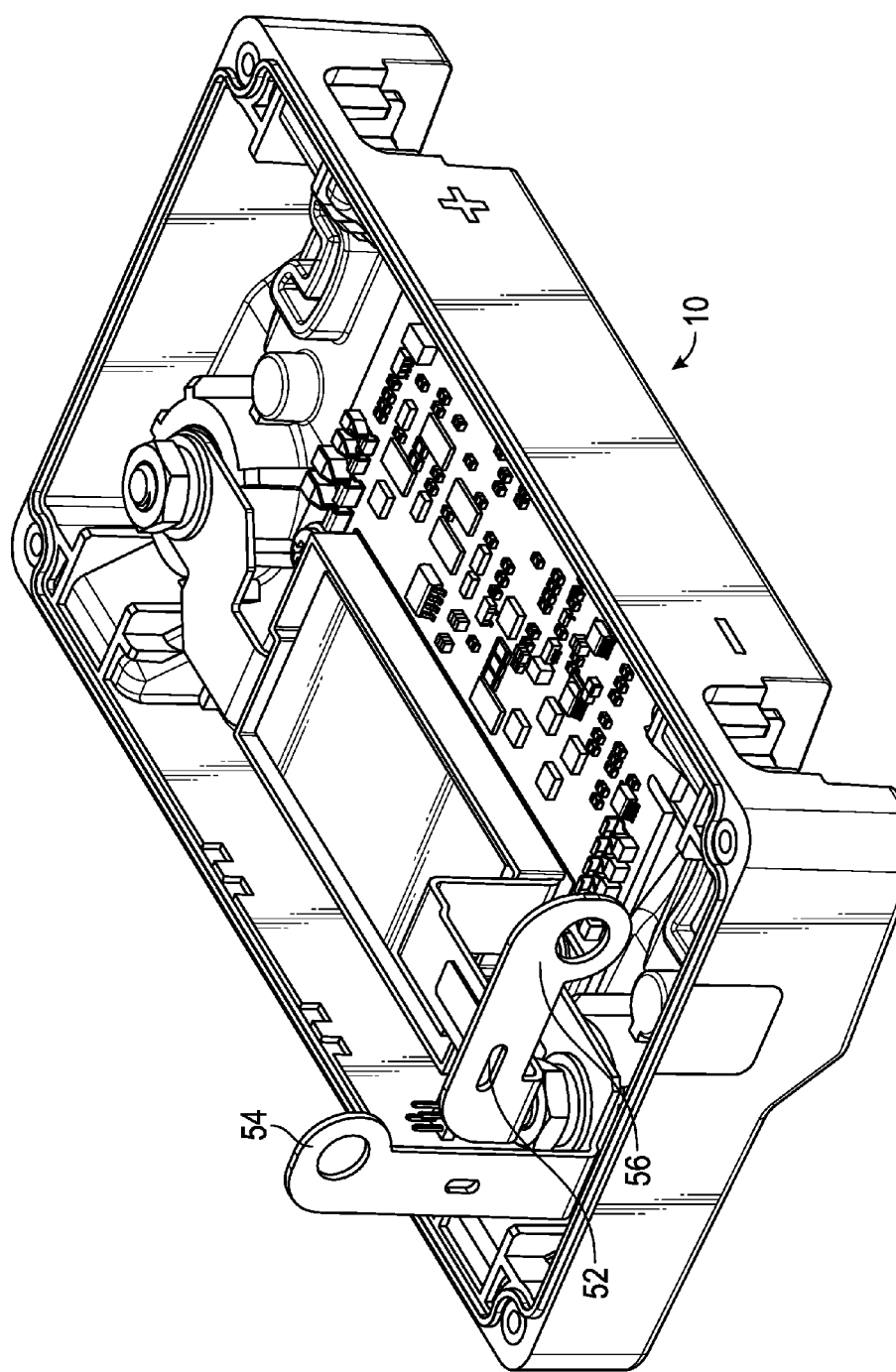
FIG. 5 illustrates a perspective view of the battery module top portion 10 flipped over to more clearly illustrate the bus bars, 54 and 56, respectively.

Bus bars may also couple a battery cell terminal to the positive battery module terminal 12 and/or the negative battery module terminal 14. FIG. 5 illustrates a preferred battery module top portion 10 that includes a first battery module terminal bus bar 54 that couples at least one battery cell 40 terminal to the battery module negative terminal 14 and a second battery module terminal bus bar 56 that couples at least at least a second battery cell 40 terminal to the battery module positive terminal 12. In the illustrated embodiment, the first battery module terminal bus bar 54 and the second battery module terminal bus bar 56 couple to battery cell terminals on the same end of the battery housing alongside or adjacent the first frame 30A or the second frame 30B, and frame tabs 332 insert within respective matching frame tab apertures 52 extending or protruding from the same battery cell carrier frame i.e. either the first frame 30A or the second frame 30B. The insertion of frame tabs 332 into frame tab aperture(s) 52 during battery module assembly ensures proper battery module assembly and restricts movement of the first bus bar 54 or the second bus bar and prevents or reduces the likelihood that positive and negative charged bus bars will make contact and short the battery cells 40. An exemplary second battery module terminal bus bar 56 mechanically couples to the inner wall of the housing top portion 10 and includes an electrical circuit such as a switch or electrical contactor that is coupled electrically in series between at least one battery cell terminal and the battery module positive battery terminal 12. See FIG. 5. The frame tab aperture 52 that couples to the positioned and oriented tab on the second frame 30B prevents the horizontal and vertical movement of the second battery module terminal bus bar 56.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A battery module assembly, comprising;
an interior housing wall having a vertical dimension and a first interior housing wall tapered edge acutely angled relative to the vertical dimension;
a first frame having at least one battery electrode aperture and a tapered frame edge acutely angled relative to the vertical dimension and aligned and positioned for longitudinal contact with the first interior housing wall tapered edge; and
at least one battery cell having a terminal and an external battery cell wall, the external battery cell wall in circumferential contact with the first frame at the battery electrode aperture, the battery cell accessible though the battery electrode aperture;
wherein during assembly, the tapered frame edge longitudinally contacts and slides against the first interior housing wall tapered edge and guides the first frame and battery cell therein to a fixed position.

2. The battery module assembly in claim 1, wherein
the interior housing wall has at least a second interior housing wall tapered edge and the battery module assembly further comprises;
a second frame having at least one battery electrode aperture and a tapered frame edge acutely angled relative to the vertical dimension and aligned and positioned for longitudinal contact with the second tapered housing interior edge; and
at least one battery cell contacting the first frame and the second frame at the respective battery electrode apertures;
wherein during assembly, the tapered frame edges of the first frame and the second frame longitudinally contact and slide against the first interior housing wall tapered edge and the second interior housing wall tapered edge, respectively, and guide the first frame and second frame and the at least one battery cell therein to a fixed position.

3. The battery module assembly in claim 2 wherein
the first frame and the second frame are coupled together by at least two frame ribs and the first frame and the second frame each contact opposite sides of the interior housing wall.

4. The battery module assembly in claim 3 wherein,
the frame ribs each comprise a relative narrow width beam that are each coupled substantially perpendicularly on one end to the first frame and on a second end to the second frame.

5. The battery module assembly in claim 2 wherein,
the first frame has two tapered frame edges and the second frame has two tapered frame edges and the interior housing wall has interior housing wall tapered edges positioned to contact and slide against the two tapered frame edges and the two tapered frame edges of the first frame and second frame, respectively.

6. The battery module assembly in claim 5 wherein,
the first frame moves relative to the second frame before and during insertion of the first frame and second frame against the interior housing wall due to sliding contact between the tapered frame edges and the interior housing wall tapered edges and wherein after assembly, the first frame is fixed relative to the second frame and the interior housing wall after completion of insertion of the first frame and second frame against the interior housing wall.

7. The battery module assembly in claim 2 wherein,
the first frame and the second frame each comprise a substantially flat internal frame portion with the electrode cell apertures therein and oriented substantially perpendicularly to the at least one battery cell and the substantially flat internal frame portions each transition to the tapered frame edges on opposite sides of the substantially flat internal frame portion.

8. The battery module assembly in claim 7 wherein the first frame and the second frame each further comprise,
tapered longitudinal frame sliding surfaces that are substantially flat relative to the interior housing wall and positioned and oriented to contact and slide against a tapered interior wall sliding surface during assembly, and a second tapered frame edge that is substantially parallel to and oriented to contact and slide against additional tapered housing interior edges during assembly.

9. The battery module assembly in claim 8 wherein,
the first frame and the second frame each further comprise at least two frame surfaces that are substantially flat relative to the interior housing wall and positioned and oriented to contact and slide against flat housing interior longitudinal sliding-surfaces during assembly, and the first frame and the second frame each further comprise at least two additional tapered frame edges that are substantially parallel to and oriented to contact and slide against additional tapered housing interior edges during assembly.

10. The battery module assembly in claim 9 wherein,
the at least two frame surfaces and the flat housing interior longitudinal sliding-surfaces are acutely angled relative to a normal extending opposite the direction of insertion of the at least one battery cell during assembly.

11. The battery module assembly in claim 7 further comprising,
a bus bar coupled to the terminal and having a frame tab aperture and oriented and positioned to receive a frame tab extending from at least one of the substantially flat internal frame portions.

12. The battery module assembly in claim 11 wherein,
the frame tab comprises is substantially rectangular and the frame tab aperture is a matching slot.

13. The battery module assembly in claim 1 wherein,
the tapered frame edge comprises a positive edge and the first interior housing wall tapered edge comprises a negative edge.

14. A battery module assembly, comprising:
at least a first battery cell having respective battery cell ends with respective terminals;
a battery cell carrier including a first frame and a second frame, wherein the first frame and the second frame each include a substantially flat portion having a battery terminal aperture, each battery terminal aperture in circumferential contact with one of the respective battery cell ends, the substantially flat portion transitioning to at least one frame biasing edge; and
a battery cell housing having a respective housing interior wall biasing edge respectively positioned and oriented to contact the at least one frame biasing edge.

15. The battery module assembly of claim 14 wherein,
the at least one frame biasing edge and the housing interior wall biasing edge are acutely-angled relative to the direction of insertion of the battery cell carrier into the battery cell housing.

16. The battery module assembly of claim 15 wherein,
the housing interior wall includes structural ribbing and the housing interior wall biasing edge is formed of the edges of the structural ribbing.

17. The battery module assembly of claim 16 wherein,
the structural ribbing comprises the edges of a shape selected from the group consisting of a rhombus, trapezoid, a kite and equivalent shapes having an edge angled relative to the direction of insertion of the battery cell carrier into the battery cell housing.

18. The battery module assembly of claim 17 further comprising,
at least a second battery cell also having respective battery cell ends with respective terminals;
the first frame and second frame substantially flat portions each further include a second battery terminal aperture, each second battery terminal aperture in circumferential contact with one of the respective battery cell ends of the second battery cell; and
at least one substantially flat electrically conductive bus bar oriented substantially parallel to the substantially flat portion and coupling one of the first battery terminals to one of the second battery terminals.

19. The battery module assembly of claim 18 wherein,
the substantially flat portions further include at least one frame tab that extends substantially perpendicularly and insert into a respective frame tab aperture in the bus bar in one correct orientation only.

20. The battery module assembly of claim 19 wherein,
the frame tab comprises a raised substantially rectangular protrusion and the frame tab aperture comprises a substantially rectangular slot.

* * * * *